US012456357B2

(12) United States Patent
Cerutti

(10) Patent No.: US 12,456,357 B2
(45) Date of Patent: Oct. 28, 2025

(54) SYSTEMS AND METHODS FOR IDENTIFYING TAMPERING WITH A MONITORING DEVICE

(71) Applicant: BI Incorporated, Boulder, CO (US)

(72) Inventor: Justin Cerutti, Denver, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 18/733,686

(22) Filed: Jun. 4, 2024

(65) Prior Publication Data

US 2025/0252832 A1 Aug. 7, 2025

Related U.S. Application Data

(60) Provisional application No. 63/549,924, filed on Feb. 5, 2024.

(51) Int. Cl.

*G08B 13/189* (2006.01)
*G01D 5/34* (2006.01)
*G08B 21/02* (2006.01)

(52) U.S. Cl.

CPC ............. *G08B 13/189* (2013.01); *G01D 5/34* (2013.01); *G08B 21/0269* (2013.01); *G08B 21/0286* (2013.01)

(58) Field of Classification Search

CPC .............. G08B 13/189; G08B 21/0269; G08B 21/0286; G01D 5/34

See application file for complete search history.

(56) References Cited

U.S. PATENT DOCUMENTS 5,650,766 A * 7/1997 Burgmann ............ G08B 21/22 340/568.1
10,909,840 B1 * 2/2021 Freathy ................ G08B 29/046

* cited by examiner

*Primary Examiner* — Seung C Sohn
(74) *Attorney, Agent, or Firm* — Osha Bergman Watanabe & Burton LLP

(57) ABSTRACT

Various embodiments provide systems and methods using light sensing to detect tampering with attachment of a monitoring device.

21 Claims, 9 Drawing Sheets

SYSTEMS AND METHODS FOR IDENTIFYING TAMPERING WITH A MONITORING DEVICE

CROSS REFERENCE TO RELATED APPLICATIONS

The present application claims priority to (is a non-provisional application of) U.S. Pat. App. No. 63/549,924 entitled "SECURING CLIP TAMPER DETECTION" and filed Feb. 5, 2024 by Cerutti. The entirety of the aforementioned reference is incorporated herein by reference for all purposes.

BACKGROUND OF THE INVENTION

Various embodiments provide systems and methods for securing a monitoring device to an individual, and more particularly to systems and methods for using light sensing to detect tampering with a user attached monitoring device.

Tracking devices have been attached to monitored individuals and provide an ability to automatically determine the location of the respective monitored individual. Such tracking devices can include, for example, location determination circuitry that depends upon, for example, signal reception from location satellites, WiFi devices, and/or transmitting beacons. The location services provide a location of the tracking device, and thus to identify the location of the individual the tracking device must be in proximity of the individual. Some approaches secure the tracking device to the individual, but the attachment mechanism can be overcome allowing for undetectable removal of the monitoring device. Such situation leaves monitoring personnel with the impression that the tracking information represents the location of the individual when it does not.

Thus, for at least the aforementioned reasons, there exists a need in the art for more advanced approaches, devices and systems for ensuring detectability of tamper with a mechanism securing the monitoring device to an individual.

BRIEF SUMMARY OF THE INVENTION

Various embodiments provide systems and methods for securing a monitoring device to an individual, and more particularly to systems and methods to detect tampering with a user attached monitoring device.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
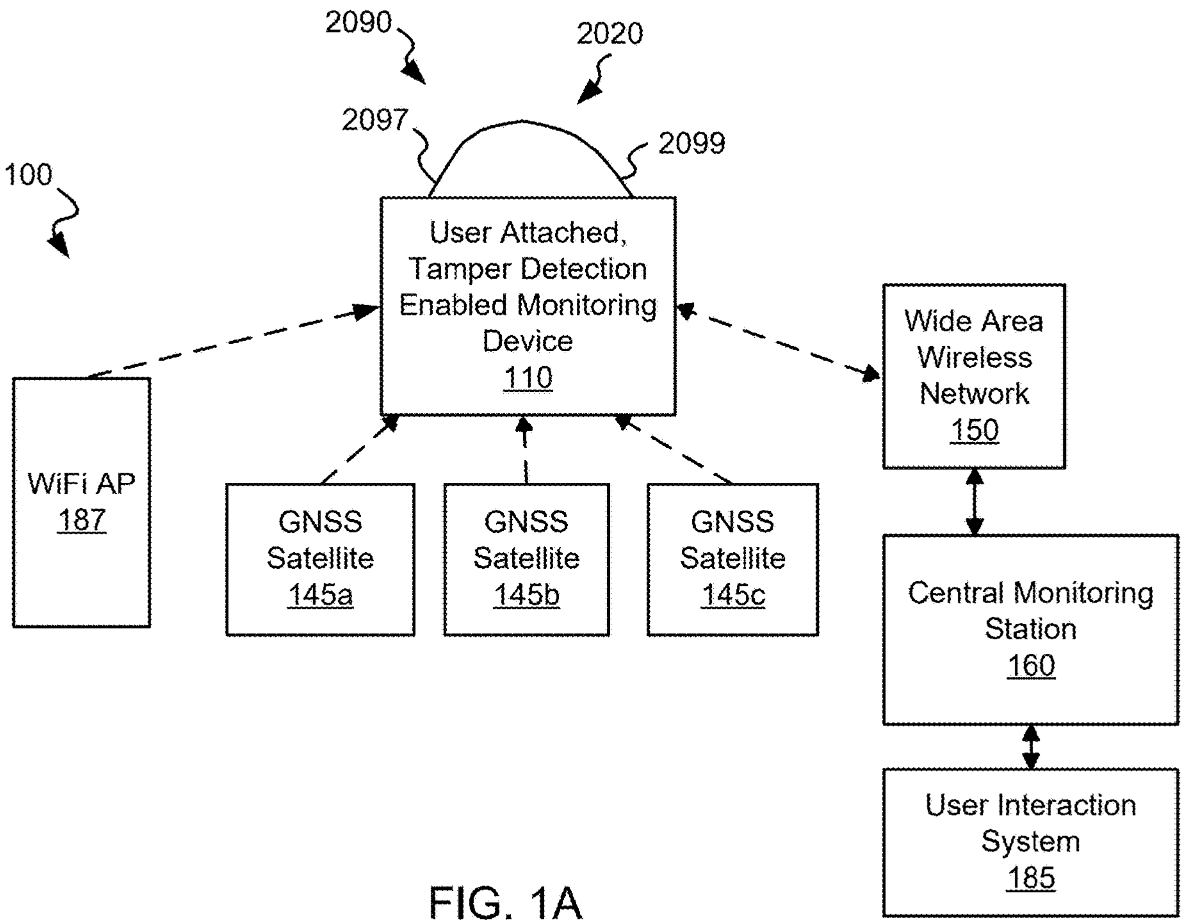
FIG. 1A-1C are block diagrams illustrating a location monitoring system that includes a user attached, tamper detection enabled monitoring device having an attachment element configured to secure the user attached, tamper detection enabled monitoring device to a monitored individual in accordance with various embodiments.

Various embodiments provide systems and methods using light sensing to detect tampering with a user attached monitoring device.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "cell" includes reference to one or more of such cells.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the elements shown in a flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Various embodiments provide methods for detecting a tamper with a monitoring device secured to a monitored individual. Such methods include: detecting light, by a light sensor associated with the monitoring device, where the light sensor is disposed in relation to the monitoring device at a location that is precluded from receiving light when a securing clip is in place holding an attachment element secure to the monitoring device; receiving, by a light-based tamper detection circuit associated with the monitoring device, an indication of the detected light; and based at least in part on receiving the indication of the detected light, transmitting by the monitoring device a tamper indication to a central monitoring station.

In some instances of the aforementioned embodiments, the monitoring device includes a wide area transceiver, and wherein transmitting the tamper indication to the central monitoring station is done wirelessly via the wide area transceiver. In various instances of the aforementioned embodiments, the methods further include: determining, by a controller circuit of the monitoring device, an occurrence of a tamper based upon a non-light-based sensed data; and based upon a combination of receiving the indication of the detected light and the occurrence of the tamper, modifying the tamper indication prior to transmitting the tamper indication to the central monitoring station. In some such instances, the non-light-based sensed data is continuity data determined by detecting a failure of a signal to traverse the attachment element from a first side of the monitoring device to a second side of the monitoring device.

In various instances of the aforementioned embodiments, the monitoring device includes a light path configured to transfer light to the light sensor. In some such instances, the light path includes two or more of a light channel, a lens, and/or a light pipe. In some cases, the light channel is blocked when the securing clip is in place holding the attachment element secure to the monitoring device. In various cases, the lens focuses light into the light pipe, and wherein the light pipe is adjacent the light sensor.

In some instances of the aforementioned embodiments, the monitoring device further includes a light source configured to shine light into the light path. In some cases, the light source is a light emitting diode.

Other embodiments provide monitoring systems that include: a monitoring device housing, an attachment element, a light sensor, and a securing clip. The monitoring device housing encases a monitoring circuit. The attachment element has a first end and a second end, where the first end is configured to attach to a first side of the monitoring device housing and the second end is configured to attach to a second side of the monitoring device housing. The light sensor deployed in relation to the first side of the monitoring device housing and is configured to detect light in a light path in the monitoring device housing and to provide an indication of detected light to the monitoring device circuit. The securing clip is configured to hold the first end of the first attachment element to the first side of the monitoring device housing and to block the light path.

In some instances of the aforementioned embodiments, the monitoring circuit includes: a light-based tamper detection circuit, a controller circuit, and a transceiver circuit. The light-based tamper detection circuit is configured to receive the indication of detected light and to generate a light-based tamper signal based at least in part on the indication of detected light. The controller circuit is configured to receive the light-based tamper signal and to generate a tamper output based at least in part on the light-based tamper signal. The transceiver is configured to wirelessly transmit the tamper output. In some cases, two or more of the light-based tamper detection circuit, the controller circuit, and/or the transceiver circuit are implemented on the same semiconductor device. In various cases, the monitoring circuit further includes an additional tamper detection circuit configured to detect a non-light-based tamper. The controller circuit is configured to receive the non-light-based tamper and to generate a tamper output based at least in part on the light-based tamper and the non-light-based tamper. In some such cases, the non-light-based tamper is a continuity-based tamper, and the additional tamper detection circuit is configured to detect a failure of a signal to traverse the attachment element from the first side of the monitoring device housing to the second side of the monitoring device housing.

In various instances of the aforementioned embodiments, the monitoring system further includes a light source attached to the monitoring device housing and configured to light the light path. Light from the light source is blocked from the light sensor when the securing clip is holding first end of the first attachment element to the first side of the monitoring device housing. In some cases, the light source is a light emitting diode.

In some instances of the aforementioned embodiments, the light path includes two or more of: a light channel; a lens; and a light pipe. In some cases, the securing clip blocks the light channel when the securing clip is holding first end of the first attachment element to the first side of the monitoring device housing. In various cases, the lens focuses light into the light pipe, and wherein the light pipe is adjacent the light sensor.

Turning to FIG. 1A, a block diagram illustrates a monitoring system 100 in accordance with some embodiments including a user attached, tamper detection enabled monitoring device 110 and a central monitoring station 160. Central monitoring station 160 is wirelessly coupled to user attached, tamper detection enabled monitoring device 110 via one or more wide area wireless (e.g., cellular telephone network, Internet via a WiFi access point, or the like) communication networks 150. User attached, tamper detection enabled monitoring device 110 includes an attachment element 2090 with a first end 2097 and a second end 2099. Each of first end 2097 and second end 2099 is secured to user attached, tamper detection enabled monitoring device 110 using a securing clip (not shown). When the securing clip(s) is/are removed, light is allowed to pass to a light sensor (not shown) of user attached, tamper detection enabled monitoring device 110. When light is detected by user attached, tamper detection enabled monitoring device

110, a potential attempt to remove user attached, tamper detection enabled monitoring device 110 is identified and a tamper alert is generated.

In some embodiments, an electrically or optically conductive material (not shown) passes through a middle area (not shown) of attachment element 2090 and connects to different locations of user attached, tamper detection enabled monitoring device 110. In such an embodiment, an electric signal or an optical signal may pass from user attached, tamper detection enabled monitoring device 110 through attachment element 2090 and back to user attached, tamper detection enabled monitoring device 110. Where a discontinuity is indicated by, for example cutting or removing attachment element 2090 a tamper alert is generated.

Central monitoring station 160 may be any location, device or system where location data and/or other types of data are received, including by way of non-limiting example: a cellular/smart phone, an email account, a website, a network database, and a memory device. The location data and/or other types of data are stored by central monitoring station 160 and are retrievable by a monitoring individual, such as a parent, guardian, parole officer, court liaison, spouse, friend, or other authorized group or individual. In this manner, the monitoring individual is able to respond appropriately to detected activity of a monitored individual. In some cases, the monitoring individual is able to retrieve the location data and/or other data types via a user interaction system 185 which may be, but is not limited to, a network connected user interface device communicatively coupled via a network to central monitoring station 160 and/or directly to user attached, tamper detection enabled monitoring device 110 via wide area wireless network 150.

Central monitoring station 160 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the monitored individual in accordance with the described embodiments. In particular, the interactive web portals may enable the monitor to retrieve the location and user identification data of one or more monitored individuals, set or modify 'check-in' schedules, and/or set or modify preferences. The interactive web portals are accessible via a personal computing device, such as, for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

User attached, tamper detection enabled monitoring device 110 includes a location sensor that senses the location of user attached, tamper detection enabled monitoring device 110 and generates corresponding location data. For example, when user attached, tamper detection enabled monitoring device 110 is capable of receiving wireless global navigation satellite system (hereinafter "GNSS") location information 136, 138, 139 from a sufficient number of GPS or GNSS satellites 145 respectively, user attached, tamper detection enabled monitoring device 110 may use the received wireless GNSS location information to calculate or otherwise determine the location of a human subject to which user attached, tamper detection enabled monitoring device 110 is attached. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone-based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user attached, tamper detection enabled monitoring device 110 receives location information from three or more GPS or GNSS satellites 145 via respective communication links 136, 138, 139. The location data and/or other data gathered by user attached, tamper detection enabled monitoring device 110 is wirelessly transmitted to central monitoring station 160 via wide area wireless network 150 accessed via a wireless link 135.

Further, user attached, tamper detection enabled monitoring device 110 includes WiFi based location determination circuitry that is configured to communicate with one or more WiFi access points 187, and based thereon to determine location of user attached, tamper detection enabled monitoring device 110.

Figure 1B:
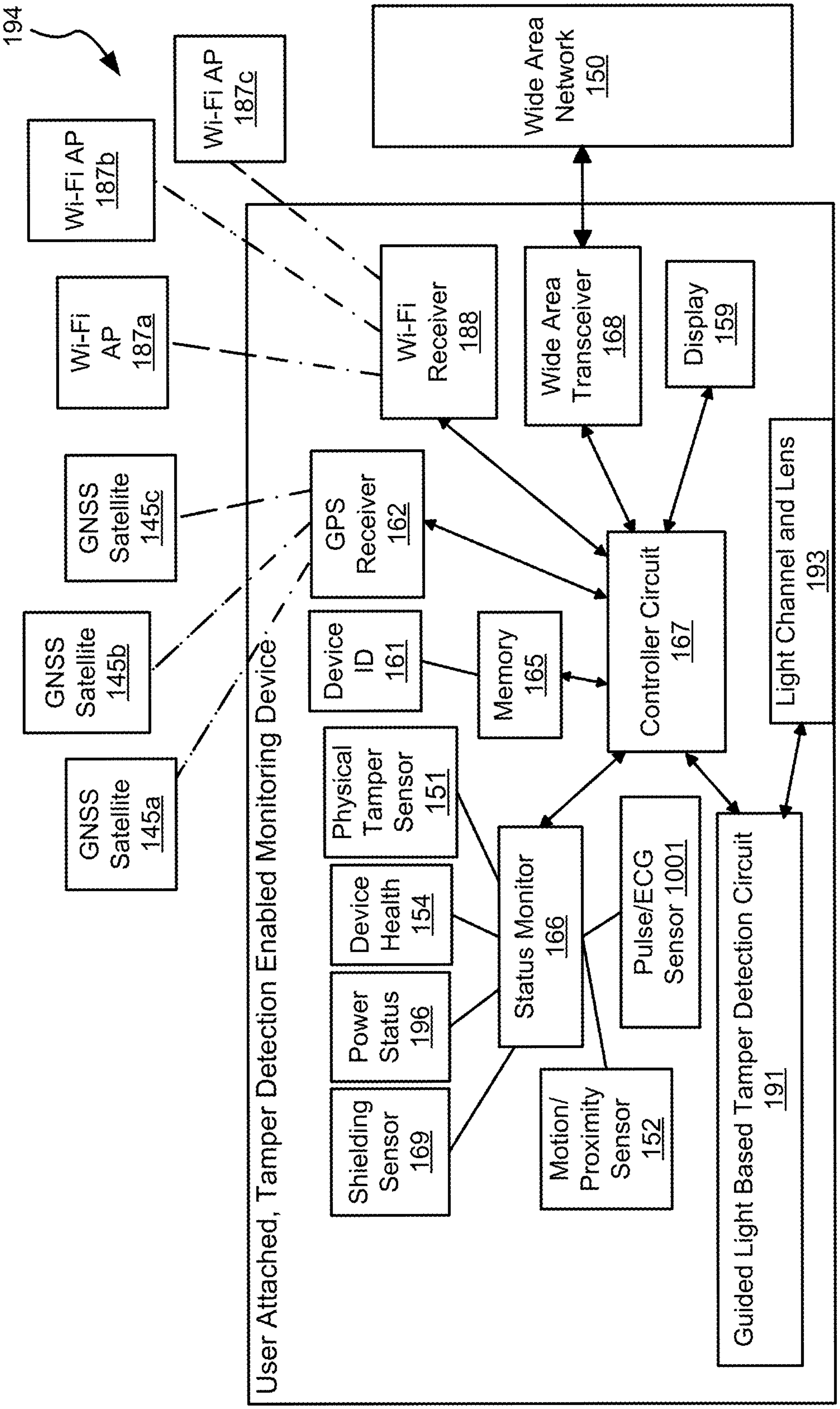

Turning to FIG. 1B, a block diagram 194 of user attached, tamper detection enabled monitoring device 110 is shown in accordance with some embodiments. As shown, user attached, tamper detection enabled monitoring device 110 includes a device ID 161 that may be maintained in a memory 165 and is thus accessible by a controller circuit 167. Controller circuit 167 interacts with a GPS receiver 162 and memory 165 at times for storing and generating records of successively determined GPS locations. Similarly, controller circuit 167 interacts with a WiFi receiver 188 and memory 165 at times for storing and generating records of successively determined WiFi access point identifications and signal strength. In some cases, memory 165 may include instructions (e.g., software-based or firmware-based instructions) executable by controller circuit 167 to perform and/or enable various functions associated with user attached, tamper detection enabled monitoring device 110. As user attached, tamper detection enabled monitoring device 110 comes within range of one or more WiFi access points (e.g., a WiFi access point 187*a*, a WiFi access point 187*b*, and/or a WiFi access point 187*c*), WiFi receiver 188 senses the signal provided by the respective WiFi access points, and provides an identification of the respective WiFi access point and a signal strength of the signal received from the WiFi access point to WiFi receiver 188. This information is provided to controller circuit 167 which stores the information to memory 165.

Where user attached, tamper detection enabled monitoring device 110 is operating in a standard mode, controller circuit 167 causes an update and reporting of the location of user attached, tamper detection enabled monitoring device 110 via a wide area transceiver 168 and wide area communication network 150. In some embodiments, wide area transceiver 168 is a cellular telephone transceiver. In some cases, the location data is time stamped. In contrast, where user attached, tamper detection enabled monitoring device 110 is within range of a public WiFi access point, reporting the location of user attached, tamper detection enabled monitoring device 110 may be done via the public WiFi access point in place of the cellular communication link.

Which technologies (e.g., GNSS and/or WiFi) are used to update the location of user attached, tamper detection enabled monitoring device 110 may be selected either by default, by programming from central monitor station 160, or based upon conditions detected in user attached, tamper detection enabled monitoring device 110 with corresponding pre-determined selections. For example, it may be determined whether sufficient battery power as reported by power status 196 remains in user attached, tamper detection enabled monitoring device 110 to support a particular position determination technology.

In some cases, a maximum cost of resolving location may be set for user attached, tamper detection enabled monitoring device 110. For example, resolving WiFi location data or via a non-associated device may incur a per transaction cost to have a third-party service provider resolve the location information. When a maximum number of resolution requests have been issued, the WiFi position determination technology or the non-associated device approach may be disabled.

Further, it may be determined whether the likelihood that a particular position determination technology will be capable of providing meaningful location information. For example, where user attached, tamper detection enabled monitoring device 110 is moved indoors, GPS receiver 162 may be disabled to save power. Alternatively, where the tracking device is traveling at relatively high speeds, WiFi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached, tamper detection enabled monitoring device 110 is stationary, the lowest cost (from both a monetary and power standpoint) tracking may be enabled while all other technologies are disabled. Which position determination technologies are used may be based upon a zone in which a tracking device is located. Some zones may be rich in WiFi access points and in such zones WiFi technology may be used. Otherwise, another technology such as cell tower triangulation or GPS may be used. Based upon the disclosure provided herein, one of ordinary skill in the art will recognize other scenarios and corresponding combinations of technologies may be best.

Controller circuit 167 of user attached, tamper detection enabled monitoring device 110 at times functions in conjunction with wide area transceiver 168 to send and receive data and signals through wide area communication network 150. This link at times is useful for passing information and/or control signals between a central monitoring system 160 and user attached, tamper detection enabled monitoring device 110. The information transmitted may include, but is not limited to, location information, measured alcohol information, one or more passive or active impairment tests applied to the monitored individual, and information about the status of user attached, tamper detection enabled monitoring device 110. Based on the disclosure provided herein, one of ordinary skill in the art will recognize a variety of information that may be transferred via wide area communication network 150.

Various embodiments of user attached, tamper detection enabled monitoring device 110 include a variety of sensors capable of determining the status of user attached, tamper detection enabled monitoring device 110, and of the individual to which it is attached. For example, a status monitor 166 may include one or more of the following subcomponents: power status sensor 196 capable of indicating a power status of user attached, tamper detection enabled monitoring device 110, and/or a pulse/ECG sensor 1001 operable to sense pulse rate of the monitored individual and an electrocardiogram unique to the monitored individual based upon electrodes (not shown) in contact with the skin of the monitored individual. The power status may be expressed, for example as a percentage of battery life remaining. Based upon the disclosure provided herein, one of ordinary skill in the art will recognize a variety of forms in which power status may be expressed. The pulse rate may be expressed in beats per minute and the ECG may be shown visually via display 159. Based upon the disclosure provided herein, one of ordinary skill in the art will recognize a variety of forms in which pulse rate and/or ECG rate may be expressed.

In addition, user attached, tamper detection enabled monitoring device 110 includes a set of shielding sensors 169 that are capable of determining whether user attached, tamper detection enabled monitoring device 110 is being shielded from receiving GPS signals and/or if GPS jamming is ongoing, a set of device health indicators 154, a tamper sensor 151 capable of determining whether unauthorized access to user attached, tamper detection enabled monitoring device 110 has occurred or whether user attached, tamper detection enabled monitoring device 110 has been removed from an associated individual being monitored, and/or a motion/proximity sensor 152 capable of determining whether user attached, tamper detection enabled monitoring device 110 is moving and/or whether it is within proximity of an individual associated with user detached monitor device (not shown—see FIG. 3) associated with the monitored individual. In some cases, motion/proximity sensor 152 includes one or more accelerometer sensors and/or vibration gyro sensors that are capable of accurately sensing motion of the monitored individual. In addition, motion/proximity sensor 152 includes sensors capable of determining a proximity of user attached, tamper detection enabled monitoring device 110 to a monitored individual to which the device is assigned. This information may be used to assure that the monitored individual is wearing user attached, tamper detection enabled monitoring device 110. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached, tamper detection enabled monitoring device 110 according to various different instances and/or embodiments.

Alternatively, or in addition, controller circuit 167 may receive signals from a light-based tamper detection circuit 191. Light-based tamper detection circuit 191 detects light received via a light channel and lens 193. Light channel and lens 193 are blocked when a securing clip is installed after user attached, tamper detection enabled monitoring device 110 is attached to a monitored individual. When the securing clip (not shown) is removed, light enters and light-based tamper detection circuit 191 indicates a potential tamper to controller circuit 167. In turn, controller circuit 167 causes the potential tamper to be reported to central monitoring station 160.

In some embodiments, a user input (not shown) may be integrated into a display 159 and allows for a user of user attached, tamper detection enabled monitoring device 110 to provide information to user attached, tamper detection enabled monitoring device 110. Display 159 is communicatively coupled to controller circuit 167.

Figure 1C:
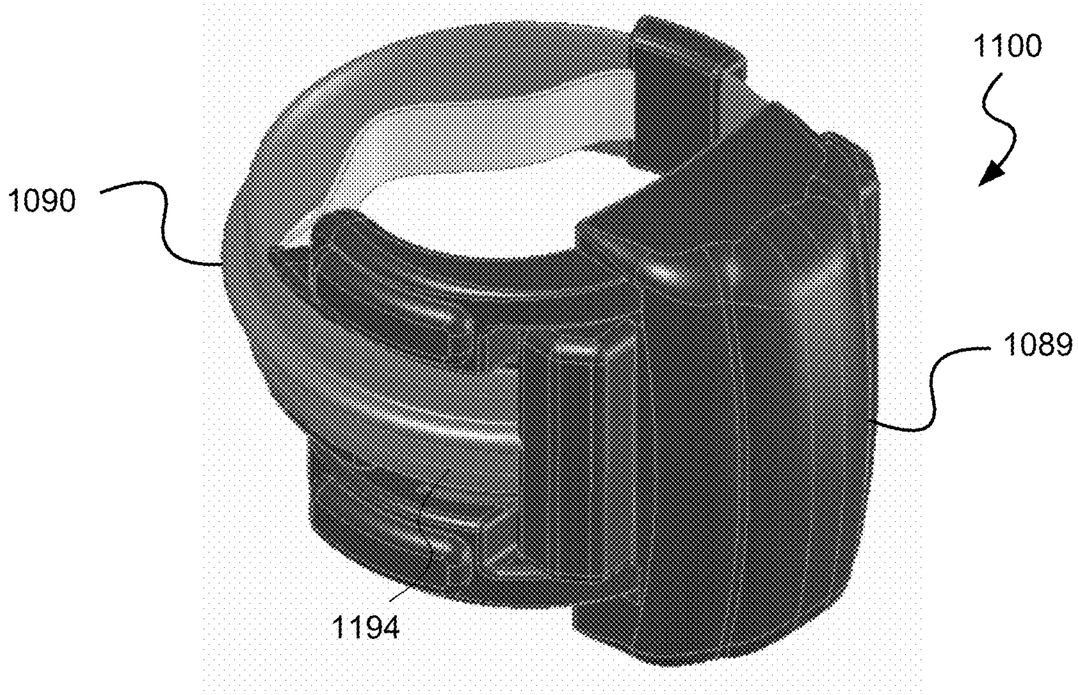

Turning to FIG. 1C, a user attached, tamper detection enabled monitoring device 1100 is shown with an example attachment element 1090 connected at opposite ends of a case 1089 of user attached, tamper detection enabled monitoring device 1100. User attached, tamper detection enabled monitoring device 1100 is another example implementation of user attached, tamper detection enabled monitoring device 110 of FIGS. 1A-1B. Attachment element 1090 is configured to securely attach a case 1089 to a limb of an individual in accordance with some embodiments.

In some embodiments, attachment element 1090 is secured to user attached, tamper detection enabled monitoring device 1100 using securing clips (not shown) that block light channels and lenses in user attached, tamper detection enabled monitoring device 1100 when properly installed. Attempting to remove user attached, tamper detection enabled monitoring device 1100 from the monitored individual may include removing the securing clips which exposes the light channels and lenses to ambient light which is detected by user attached, tamper detection enabled monitoring device 1100, and such detection may be considered an indication of a tamper event or an attempt to remove or otherwise tamper with user attached, tamper detection enabled monitoring device 1100. In various embodiments, attachment element 1090 further includes electrically and/or optically conductive material used to make a conductive connection from one side of case 1089 to the opposite side of case 1089 and is used in relation to determining whether user attached, tamper detection enabled monitoring device 1100 remains attached and/or has been tampered with. While FIG. 1C shows a strap as an example attachment element, based upon the disclosure provided herein, one of ordinary skill in the art will recognize other types of attachment elements that may be used in relation to different embodiments.

Figure 2:
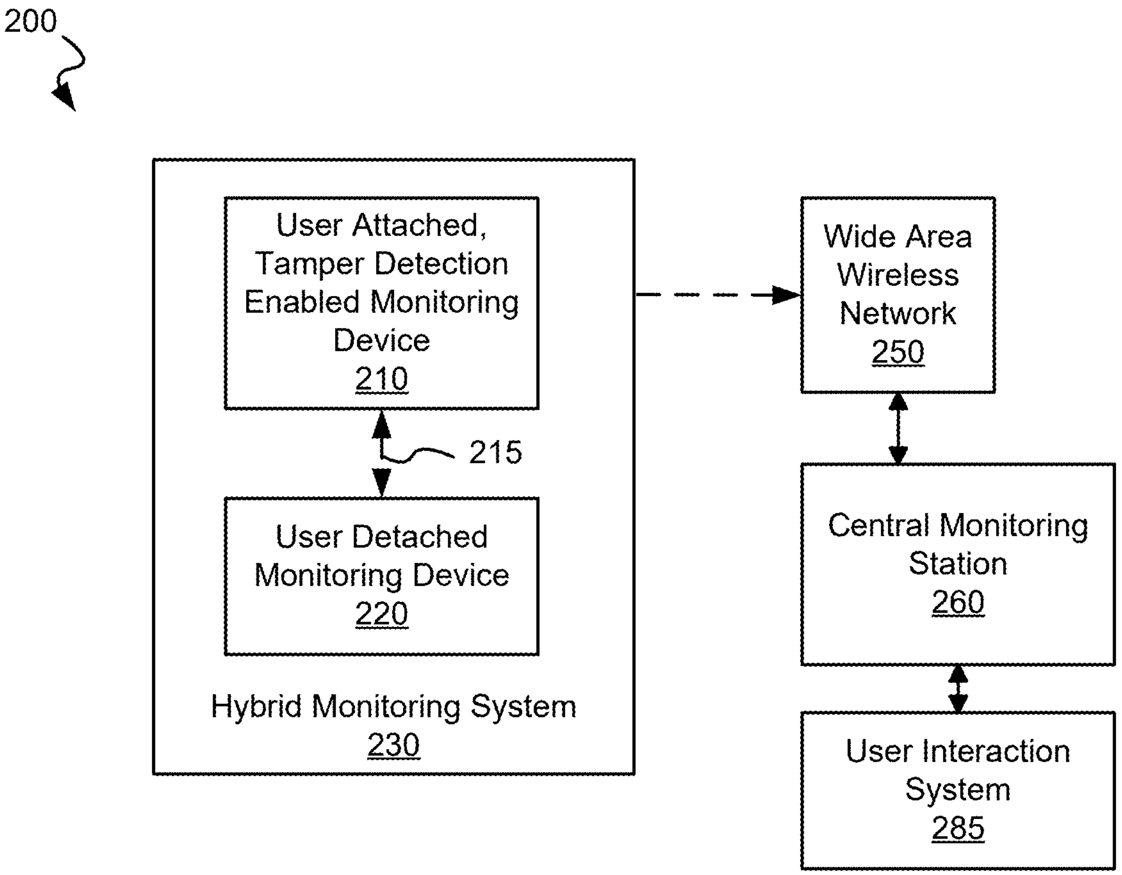
FIG. 2 shows a hybrid monitoring system using a user attached, tamper detection enabled monitoring device along with a user detached monitoring device in accordance with some embodiments.

Turning to FIG. 2, a block diagram is shown of a location monitoring system 200 including a hybrid monitoring system 230 capable of establishing location using one or more of WiFi access point-based location determination circuitry, satellite-based location determination circuitry, and/or non-associated device-based location determination circuitry in accordance with various embodiments. Hybrid monitoring system 230 includes both a user attached, tamper detection enabled monitoring device 210 and a user detached monitor device 220. User attached, tamper detection enabled monitoring device 210 is similar to either user attached, tamper detection enabled monitoring device 110.

User detached monitor device 220 is portable and may be any device that is recognized as being used by or assigned to an individual being monitored, but is not physically attached to the individual being monitored by a tamper evident attaching device. User detached monitor device 120 may be, but is not limited to, a cellular or mobile telephone configured to communicate with user attached, tamper detection enabled monitoring device 210 via a local communication link 215. In contrast, user attached, tamper detection enabled monitoring device 210 is attached to the individual being monitored using a tamper evident attaching device like a strap. User attached, tamper detection enabled monitoring device 210 may be, but is not limited to, a tracking device that is attached around the limb of an individual and includes indicators to monitor whether the device has been removed from the individual or otherwise tampered.

Location monitoring system 200 further includes a central monitoring station 260 wirelessly coupled to user attached, tamper detection enabled monitoring device 210 and/or user detached monitor device 220 via one or more wide area wireless (e.g., cellular telephone network, Internet via a Wi-Fi access point, or the like) communication networks 250.

User detached monitor device 220 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. The aforementioned location data is utilized verify the location of a user associated with user detached monitor device 220 at various points as more fully discussed below. User detached monitor device 220 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 220 corresponds to the target.

The location data and/or other data gathered by user detached monitor device 220 may be wirelessly transmitted to central monitoring station 260 via wide area wireless network. Central monitoring station 260 may be any location, device or system where the location data is received, including by way of non-limiting example: a cellular/smart phone, an email account, a website, a network database, and a memory device. The location data is stored by central monitoring station 260 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 285 which may be, but is not limited to, a network connected user interface device communicatively coupled via a network to central monitoring station 260 and/or directly to user detached monitor device 220 via wide area wireless network 250.

User detached monitor device 220 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 260 via a wireless transmitter communicatively coupled to the user identification sensor. The user identification data is stored in association with the location data by central monitoring station 260 and is retrievable therefrom by a monitor, such as a parent, guardian, parole officer, court liaison, spouse, friend, or other authorized group or individual. The monitor is configured to retrieve the location data via a network connected user interface device communicatively coupled—via the network—to central monitoring station 260 and/or to user detached monitor device 220. The location data may be transmitted to central monitoring station 260 independent of the user identification data, for example, during a periodic check-in with central monitoring system 260.

User detached monitor device 220 may further comprise a memory communicatively coupled to a control unit—which is also communicatively coupled to the location sensor, the identification sensor and the wireless transceiver—for controlling the operations thereof in accordance with the functionalities described herein. The memory may include instructions (e.g., software of firmware based instructions) executable by the control unit to perform and/or enable various functions associated with user detached monitor device 220. As user detached monitor device 220 is portable, each of the components may be located within, immediately adjacent to, or exposed without, a device housing whose dimensions are such that user detached monitor device 220 as a whole may be discretely carried by the user, for example, within a pocket or small purse.

Figure 3A:
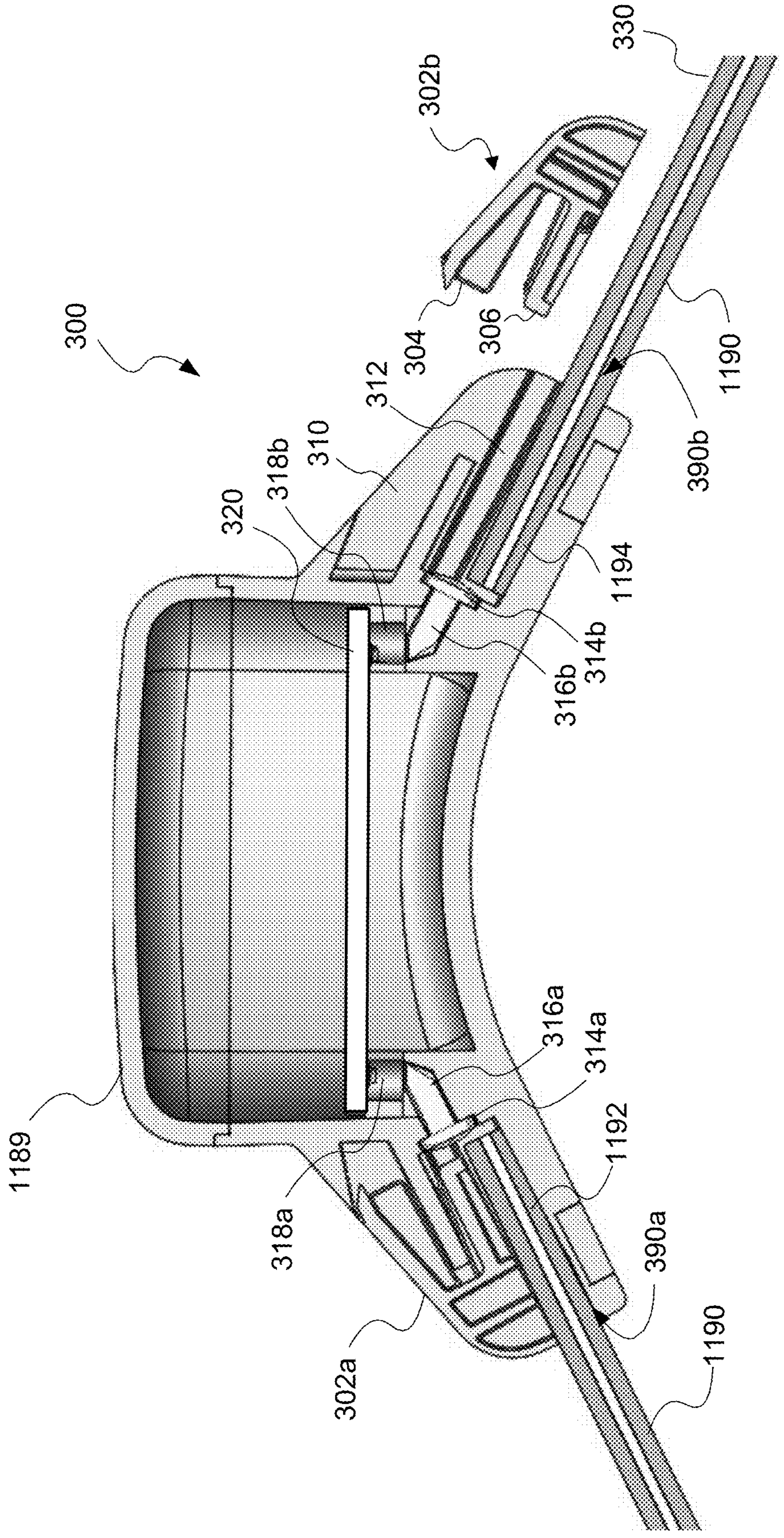
FIGS. 3A-3B show an embodiment of the user attached, tamper detection enabled monitoring device of FIG. 1C in accordance with some embodiments.
Figure 3B:
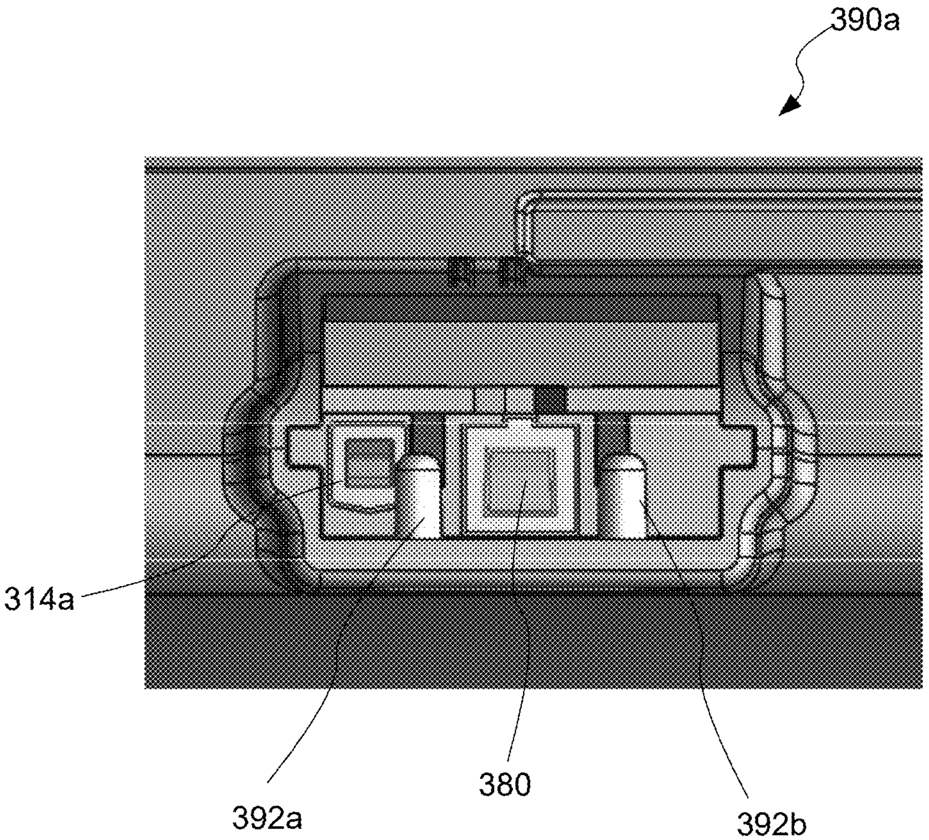

Turning to FIGS. 3A-3B, a cut away view 300 of one embodiment of user attached, tamper detection enabled monitoring device 1189 is shown in accordance with some embodiments. As shown, user attached, tamper detection enabled monitoring device 1189 includes attachment element 1190. A first end 1192 of attachment element 1190 attaches to a first side of user attached, tamper detection enabled monitoring device 1189 via an opening 390*a*, and a second end 1194 of attachment element 1190 attaches to a first side of user attached, tamper detection enabled monitoring device 1189 via an opening 390*b*. As shown, when installed around a limb of a monitored individual, first end 1192 is inserted into opening 390*a* on a first side of user attached, tamper detection enabled monitoring device 1189, and second end 1194 is inserted into opening 390*b* in a second side of user attached, tamper detection enabled monitoring device 1189.

Turning to FIG. 3B, opening 390*a*. Opening 390*b* is similar to opening 390*a*. As shown, opening 390*a* includes two posts 392*a*, 392*b*. When installed, posts 392 are inserted through holes (not shown) in first end 1192 of attachment. Such an installation holds first end 1192 firmly in opening 390*a*. Similarly, posts (not shown) in the other side of user attached, tamper detection enabled monitoring device 1189. Are inserted through holes (not shown) in second end 1194 of attachment element 1190.

Returning to FIG. 3A, once first end 1192 is installed over posts 392, a securing clip 302*a* is pressed into opening 390*a* such that it snaps around posts 392 holding first end 1192 of attachment element 1190 in place over posts 392. Securing clip 302*a* is made of plastic that once installed in opening 390*a*, it must be broken to remove it. Based upon the disclosure provided herein, one of ordinary skill in the art will recognize a variety of security clips that may be used in relation to different embodiments. As shown, when first end 1192 of attachment element 1190 and securing clip 302*a* are installed, light cannot enter opening 390*a*. As such, light does not make it to a lens 314*a*. A light pipe 316*a* optically connects lens 314*a* to a light sensor 318*a*. In some embodiments, the removal of either first end 1192 and/or securing clip 302*a* allows light to reach lens 314. Light sensors 318 may be any circuit or device known in the art that provides an electrical signal output corresponding to light being sensed. Based upon the disclosure provided herein, one of ordinary skill in the art will recognize a variety of light sensors that may be used in relation to different embodiments. Lens 314 may be any device that passes light to light pipe 316*a*. In some embodiments, lens focuses the received light. Light pipe 316*a* may be any device that is configured to pass light from lens 314*a* to light sensor 318*a*. When light is not sensed by light sensor 318*a*, light-based tamper detection circuit 191 indicates that no tamper is likely to controller circuit 167. A printed circuit board 320 provides connectivity between light sensors 318, light-based tamper detection circuit 191, and controller circuit 167.

Returning to FIG. 3B, when installed first end 1192 of attachment element 1190 and securing clip 302*a* cover up lens 314*a*, and an optical fiber or electrical conductor within attachment element 1190 contacts a transceiver 380. Where attachment element 1190 includes an electrical conductor, transceiver 380 may be any circuit configured to receive and/or transmit an electrical signal through the electrical conductor to/from contacts a transceiver (not shown) in the other side of user attached, tamper detection enabled monitoring device 1189. As discussed above, this electrical conductor and pair of transceivers can be used to pass an electrical signal through attachment element to discern if attachment element has been cut or disconnected. Similarly, where attachment element 1190 includes an optical conductor, transceiver 380 may be any circuit configured to receive and/or transmit an optical signal through the optical conductor to/from contacts a transceiver (not shown) in the other side of user attached, tamper detection enabled monitoring device 1189. As discussed above, this optical conductor and pair of transceivers can be used to pass an optical signal through attachment element to discern if attachment element has been cut or disconnected.

Returning to FIG. 3A, second side 1194 of attachment element 1190 is shown installed in an opening 390*b*. In addition, a securing clip 302*b* is shown either uninstalled or after being removed. A portion 310 of opening 390*b* and a light channel 312 is vacated when securing clip 302*b* is in such a removed condition. Light channel 312 is an opening extending to a lens 314*b*. In some embodiments, light channel 312 is coated with a reflective material to enhance the propagation of light toward lens 314*b*. When installed, a first section 306 of securing clip 302*b* fills light channel 312 and a second section 304 of securing clip 302*b* fills portion 310. When securing clip 302*b* is removed, ambient light may enter light channel 312 to lens 314*b* where it is focused and passed to a light sensor 318*b* via a light pipe 316*b*. When light is sensed by light sensor 318*b*, light-based tamper detection circuit 191 indicates that a tamper is likely to controller circuit 167.

Figure 4:
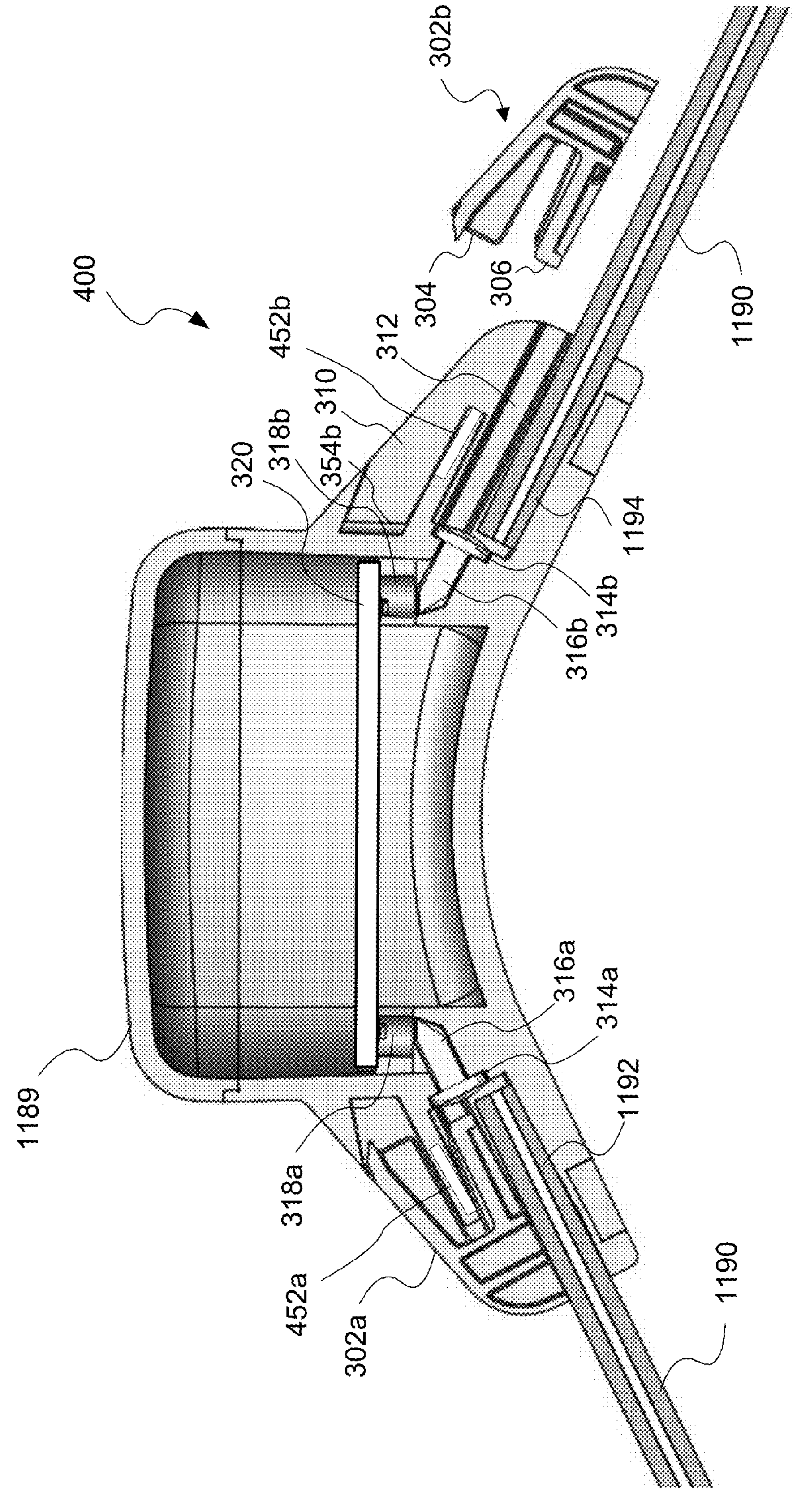
FIG. 4 show another embodiment of the user attached, tamper detection enabled monitoring device of FIG. 1C in accordance with other embodiments.

Turning to FIG. 4, a cut away view 400 of another embodiment of user attached, tamper detection enabled monitoring device 1189 is shown in accordance with other embodiments. As shown, in this embodiment, light sources 452*a*, 452*b* are is installed in user attached, tamper detection enabled monitoring device 1189. Light sources 452 may be any type of device capable of producing light. In some embodiments, light sources 452 are light emitting diodes (LEDs). As shown, light source 452*b* is deployed such that it shines into light channel 312 when securing clip 302*b* is removed. In this way, when securing clip 302*b* is removed in a scenario where there is little or no ambient light, light will still make it to lens 314*b* and be detected by light sensor 318*b*, and thereby a potential tamper can be detected even in the dark. Further, in some cases a proximity sensor 354*b* may be deployed in portion 310 to sense and indicate a proximity of securing clip 302*b*. When securing clip 302*b* is removed, proximity sensor 354*b* generates a signal that is provided to controller circuit 167 indicating removal. Any type of sensor capable of indicating a proximity of a securing clip may be used in relation to different embodiments. A signal from such a proximity sensor may provide an additional indication of a potential tamper.

Figure 5:
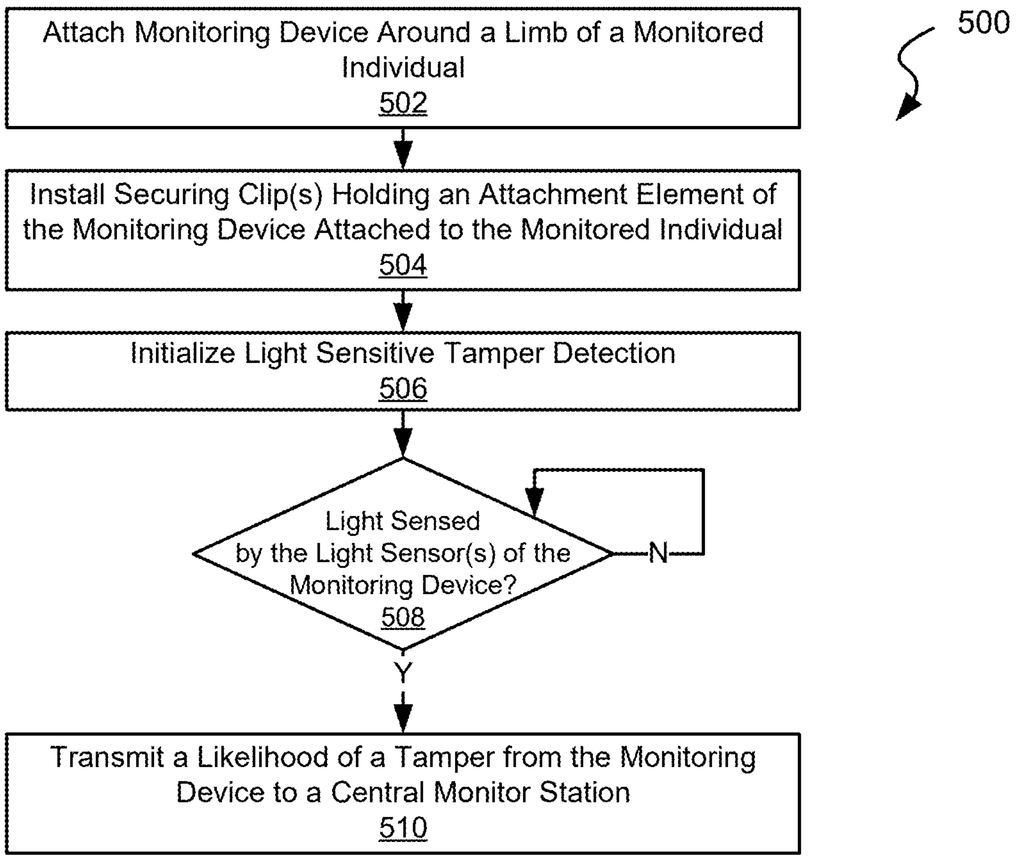
FIG. 5 is a flow diagram showing a method in accordance with some embodiments for using a user attached, tamper detection enabled monitoring device.

Turning to FIG. 5, a flow diagram 500 shows a method in accordance with some embodiments for using a user attached, tamper detection enabled monitoring device. Following flow diagram 500, a user attached, tamper detection enabled monitoring device is attached around the limb of a monitored individual (block 502). This includes inserting a first end of an attachment element over securing posts in an opening of the user attached, tamper detection enabled monitoring device, then wrapping the attachment element around the limb, and inserting a second end of an attachment element over securing posts in an opening on the opposite side of the user attached, tamper detection enabled monitoring device.

Securing clips are then inserted into the openings to hold the respective first and second ends of the attachment element in place, securing the user attached, tamper detection enabled monitoring device to the monitored individual (block 504). In some embodiments, the securing clips snap into place and are destroyed or damaged when removed.

With the securing clips in place, no light passes to the light sensors of user attached, tamper detection enabled monitoring device and a light sensitive tamper detection is initialized (block 506). Such initialization may include enabling a light-based tamper detection circuit to indicate a potential tamper when light is sensed by the light sensors.

With the light sensitive tamper detection initialized, the monitoring device is used to monitor aspects, including location, of the monitored individual. It is determined whether light has been sensed any of the light sensors in the user attached, tamper detection enabled monitoring device (block 508). Where light is detected (block 508), a likelihood of a tamper is indicated and such an indication is transmitted from the user attached, tamper detection enabled monitoring device to a central monitoring station (block 510).

Figure 6:
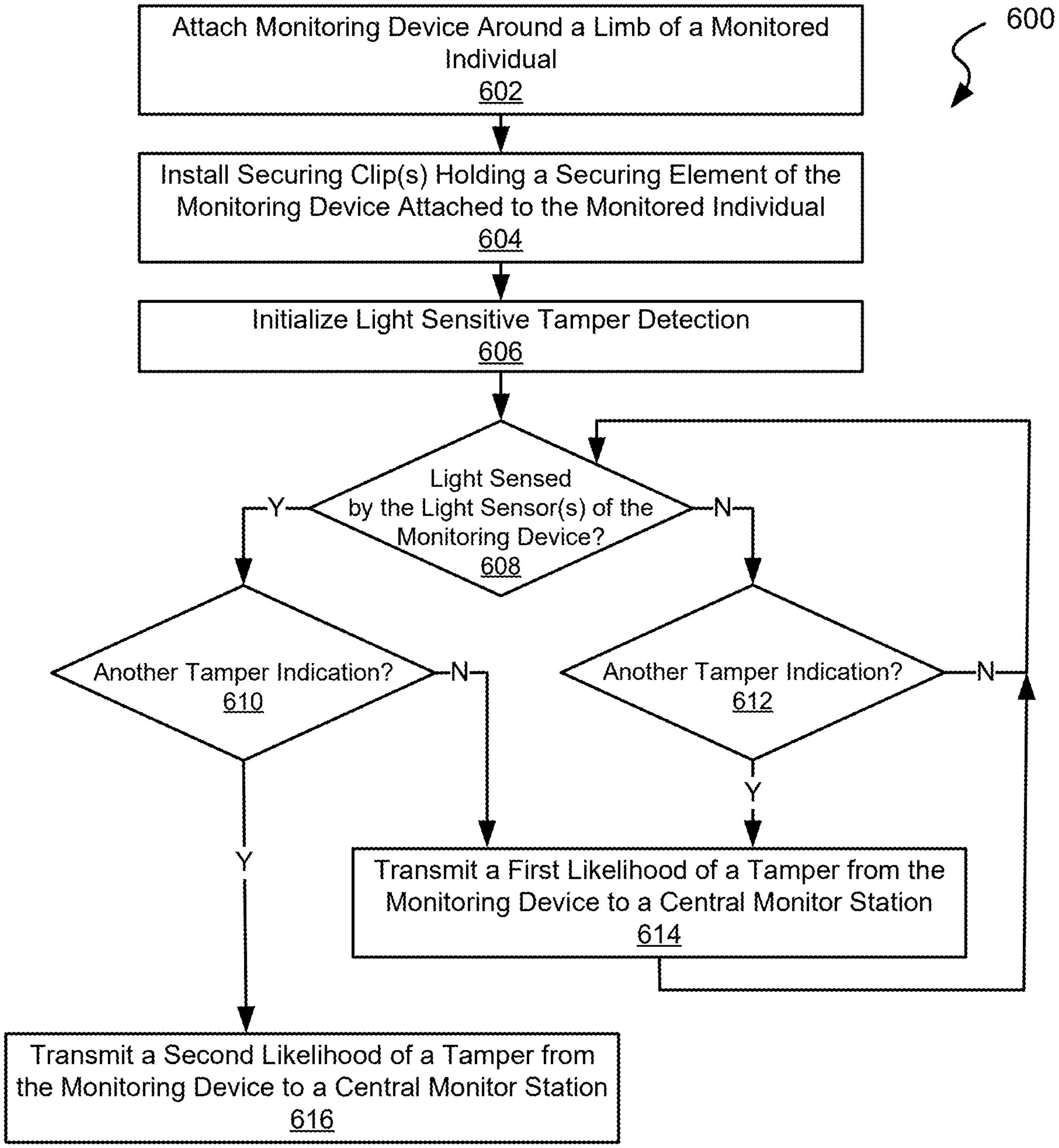
FIG. 6 is a flow diagram showing a method in accordance with other embodiments for using a user attached, tamper detection enabled monitoring device.

Turning to FIG. 6, a flow diagram 600 shows another method in accordance with other embodiments for using a user attached, tamper detection enabled monitoring device. Following flow diagram 600, a user attached, tamper detection enabled monitoring device is attached around the limb of a monitored individual (block 602). Again, this includes inserting a first end of an attachment element over securing posts in an opening of the user attached, tamper detection enabled monitoring device, then wrapping the attachment element around the limb, and inserting a second end of an attachment element over securing posts in an opening on the opposite side of the user attached, tamper detection enabled monitoring device.

Securing clips are then inserted into the openings to hold the respective first and second ends of the attachment element in place, securing the user attached, tamper detection enabled monitoring device to the monitored individual (block 604). Again, in some embodiments, the securing clips snap into place and are destroyed or damaged when removed.

With the securing clips in place, no light passes to the light sensors of user attached, tamper detection enabled monitoring device and a light sensitive tamper detection is initialized (block 606). Such initialization may include enabling a light-based tamper detection circuit to indicate a potential tamper when light is sensed by the light sensors.

With the light sensitive tamper detection initialized, the monitoring device is used to monitor aspects, including location, of the monitored individual. It is determined whether light has been sensed any of the light sensors in the user attached, tamper detection enabled monitoring device (block 608). Where light is detected (block 608), it is determined where another tamper indication has occurred (block 610). For example, the light may be sensed at a similar time that the electrical or optical signal passing through the attachment element is interrupted. Alternatively, a proximity sensor may be triggered. Based upon the disclosure provided herein, one of ordinary skill in the art will recognize a variety of additional tamper indicators that may be considered in relation to different embodiments.

Where another tamper indication has occurred (block 610), a second likelihood of a tamper is transmitted from the user attached, tamper detection enabled monitoring device to a central monitoring station (block 616). Alternatively, where another tamper indication has not occurred (block 610), a first likelihood of a tamper is transmitted from the user attached, tamper detection enabled monitoring device to a central monitoring station (block 614). The first likelihood is less than the second likelihood as there is only one indicator of a tamper. Similarly, if light is not sensed by the light sensors (block 606), but another tamper indication occurs (block 612), the first likelihood of a tamper is transmitted from the user attached, tamper detection enabled monitoring device to a central monitoring station (block 614) as only one tamper indicator has occurred.

In conclusion, the present invention provides for novel systems, devices, and methods for determining if tampering has occurred on a user attached monitoring device. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for detecting a tamper with a monitoring device secured to a monitored individual, the method comprising:

detecting light, by a light sensor associated with the monitoring device, wherein the light sensor is disposed in relation to the monitoring device at a location that is precluded from receiving light when a securing clip is in place holding an attachment element secure to the monitoring device;

receiving, by a light-based tamper detection circuit associated with the monitoring device, an indication of the detected light; and based at least in part on receiving the indication of the detected light, transmitting by the monitoring device a tamper indication to a central monitoring station.

2. The method of claim 1, wherein the monitoring device comprises:

a wide area transceiver, and wherein transmitting the tamper indication to the central monitoring station is done wirelessly via the wide area transceiver.

3. The method of claim 1, the method further comprising:

determining, by a controller circuit of the monitoring device, an occurrence of a tamper based upon a non-light-based sensed data; and based upon a combination of receiving the indication of the detected light and the occurrence of the tamper, modifying the tamper indication prior to transmitting the tamper indication to the central monitoring station.

4. The method of claim 3, wherein the non-light-based sensed data is continuity data determined by detecting a failure of a signal to traverse the attachment element from a first side of the monitoring device to a second side of the monitoring device.

5. The method of claim 1, wherein the monitoring device comprises:

a light path configured to transfer light to the light sensor.

6. The method of claim 5, wherein the light path comprises:

two or more of: a light channel, a lens, and a light pipe.

7. The method of claim 6, wherein the light channel is blocked when the securing clip is in place holding the attachment element secure to the monitoring device.

8. The method of claim 6, wherein the lens focuses light into the light pipe, and wherein the light pipe is adjacent the light sensor.

9. The method of claim 1, wherein the monitoring device further comprises:

a light source configured to shine light into the light path.

10. The method of claim 9, wherein the light source is a light emitting diode.

11. The method of claim 1, wherein detecting the light by the light sensor indicates removal or damage to one or both of:

the securing clip; and the attachment element.

12. A monitoring system, the monitoring system comprising;

a monitoring device housing, wherein the monitoring device housing encases a monitoring circuit;

an attachment element having a first end and a second end, wherein the first end is configured to attach to a first side of the monitoring device housing and the second end is configured to attach to a second side of the monitoring device housing;

a light sensor deployed in relation to the first side of the monitoring device housing and configured to detect light in a light path in the monitoring device housing and to provide an indication of detected light to the monitoring device circuit; and a securing clip configured to hold the first end of the first attachment element to the first side of the monitoring device housing and to block the light path.

13. The monitoring system of claim 12, wherein the monitoring circuit comprises:

a light-based tamper detection circuit, a controller circuit, and a transceiver circuit; and wherein the light-based tamper detection circuit is configured to receive the indication of detected light and to generate a light-based tamper signal based at least in part on the indication of detected light;

wherein the controller circuit is configured to receive the light-based tamper signal and to generate a tamper output based at least in part on the light-based tamper signal; and wherein the transceiver is configured to wirelessly transmit the tamper output.

14. The monitoring system of claim 13, wherein two or more of the light-based tamper detection circuit, the controller circuit, and the transceiver circuit are implemented on the same semiconductor device.

15. The monitoring system of claim 13, wherein the monitoring circuit further comprises:

an additional tamper detection circuit configured to detect a non-light-based tamper; and wherein the controller circuit is configured to receive the non-light-based tamper and to generate a tamper output based at least in part on the light-based tamper and the non-light-based tamper.

16. The monitoring system of claim 15, wherein the non-light-based tamper is a continuity-based tamper, and wherein the additional tamper detection circuit is configured to detect a failure of a signal to traverse the attachment element from the first side of the monitoring device housing to the second side of the monitoring device housing.

17. The monitoring system of claim 12, wherein the monitoring system further comprises:

a light source attached to the monitoring device housing and configured to light the light path, wherein light from the light source is blocked from the light sensor when the securing clip is holding first end of the first attachment element to the first side of the monitoring device housing.

18. The monitoring system of claim 17, wherein the light source is a light emitting diode.

19. The monitoring system of claim 12, wherein the light path comprises two or more of:

a light channel;

a lens; and a light pipe.

20. The monitoring system of claim 18, wherein the securing clip blocks the light channel when the securing clip is holding first end of the first attachment element to the first side of the monitoring device housing.

21. The monitoring system of claim 18, wherein the wherein the lens focuses light into the light pipe, and wherein the light pipe is adjacent the light sensor.

* * * * *